C. W. P. HEYLANDT.
METALLIC VESSEL FOR LIQUEFIED GASES.
APPLICATION FILED FEB. 6, 1912.
1,033,398.
Patented July 23, 1912.
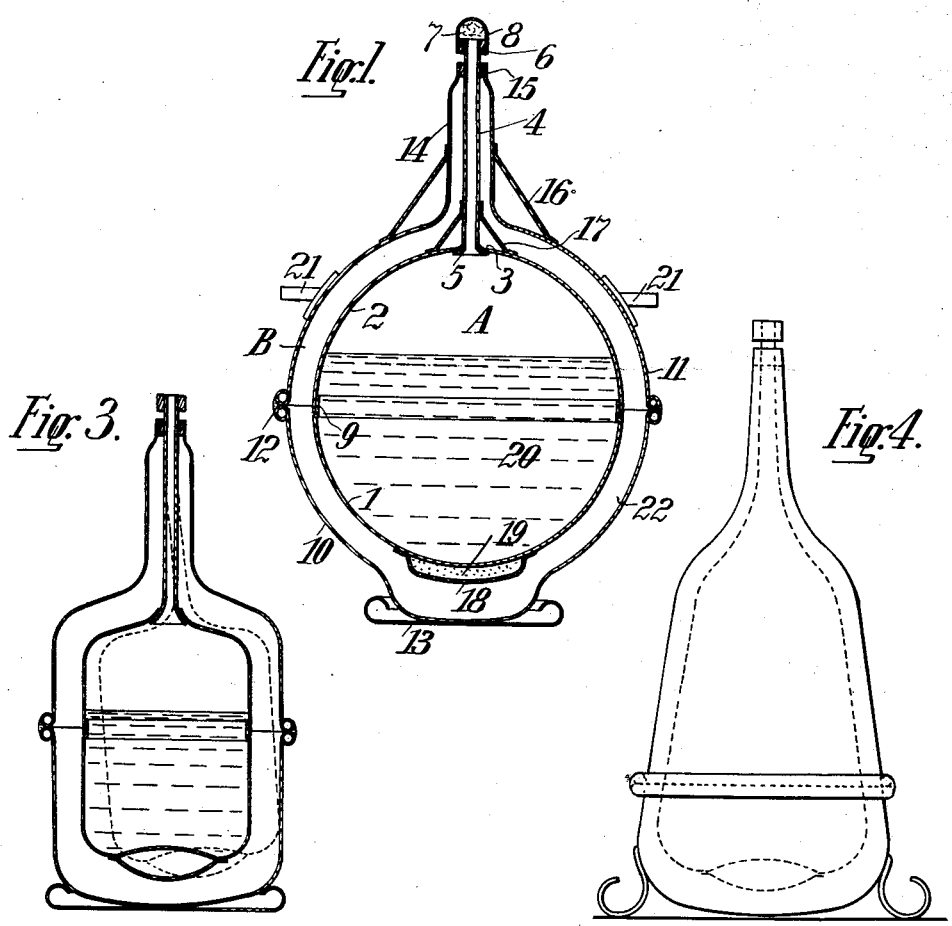
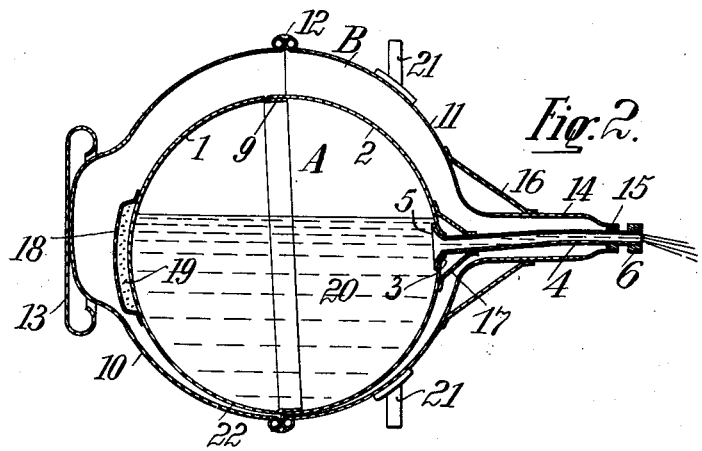
WITNESSES:
John C. Sanders
Albert F. Heuman
INVENTOR:
Christian Wilhelm Paulus Heylandt,
BY
ATTY.

UNITED STATES PATENT OFFICE.

CHRISTIAN WILHELM PAULUS HEYLANDT, OF SCHULAU, GERMANY.

METALLIC VESSEL FOR LIQUEFIED GASES.

1,033,398.  Specification of Letters Patent.  Patented July 23, 1912.

Application filed February 6, 1912. Serial No. 675,884.

*To all whom it may concern:*

Be it known that I, CHRISTIAN WILHELM PAULUS HEYLANDT, a citizen of the Empire of Germany, residing at Schulau, Hamburg, in the Empire of Germany, have invented a new and useful Metallic Vessel for Liquefied Gases, of which the following is a specification.

The known portable storage vessels for gases liquefied at low temperatures present various defects. The double glass vessels mostly used for this purpose and consisting of an outer vessel and an inner vessel separated from one another by a space of a nearly uniform width, from which space the air has been pumped out, are very fragile, do not possess great contents and can not be quickly emptied. Metallic vessels have proved to be unsatisfactory, because on account of the although but slight porosity of the metal a vacuum in the space between the inner and outer vessels can not be maintained for a sufficiently long time, so that the liquefied gas is too quickly evaporated.

My invention relates to improvements in metallic vessels, whereby a better vacuum can be maintained in the space between the inner and outer vessels than hitherto and moreover it is rendered possible to quickly empty the double vessel in a most simple and easy manner.

The neck of the inner vessel is made narrow and pliable, while its walls are so thin that their tensile strength justly suffices for carrying the inner vessel filled with liquefied gas, so as to reduce the evaporation of the liquid to a minimum for the normal position of the double vessel. For maintaining the vacuum in the space between the inner and outer vessels for as long a time as possible a gas absorbing substance is provided in the evacuated space, preferably within a perforated receptacle attached to the bottom of the inner vessel.

For rapidly emptying the double vessel it is only necessary to incline or turn over the vessel, when the neck of the inner vessel will bend and permit the outside of the inner vessel to come in contact with the inside of the outer vessel, whereby the insulation by means of the vacuum is pierced, so that heat can enter the contents from without and evaporate a little of the liquefied gas, whereupon the pressure of the developed vapor will force the contents out of the inner vessel at a great speed through the narrow neck.

I will now proceed to describe my invention with reference to the accompanying drawings, in which—

Figure 1 is a vertical longitudinal section through an improved metallic double vessel in its normal position, Fig. 2 is a similar section, the double vessel being turned over, Fig. 3 is a vertical longitudinal section through a modified metallic double vessel, and Fig. 4 is an elevation of a further modification of the metallic double vessel.

Similar characters of reference refer to similar parts throughout the several views.

The metallic double vessel illustrated in Figs. 1 and 2 consists of a globular inner vessel A and a substantially globular outer vessel B. The inner vessel A may be made in halves 1 and 2, which can be formed from sheet metal (for example sheet steel) by drawing, pressing or in any other known manner. The upper half 2 is shown to have a central hole 3, through which a narrow tube 4 serving as a neck is introduced. The lower end of the tube 4 is turned over so as to form a flange 5, which can be soldered or otherwise fastened on the inside of the upper half 2. In general the tube 4 is made of steel, but in some cases it may be preferable to make this tube of manganese steel. At the upper end of the tube 4 a metallic collar 6 may be soldered on, so that a piece of wadding 7 can be put on and a perforated cap 8 may be made to inclose the wadding 7 and the collar 6. However any other known closure may be employed, if so preferred, the essential points being that it serve as a sort of safety-valve. The two halves 1 and 2 are shown to be joined at 9 and may be connected together by soldering or otherwise. The outer vessel B may be made in halves 10 and 11, which may be connected together at 12 by soldering in any known manner. A flanged base plate 13 may be soldered on the bottom of the lower half 10. The upper half 11 is shown to be made in one with a wide neck 14, the upper end of which is contracted and may be rigidly connected with the narrow neck 4 of the inner vessel A by means of a piece of solder 15. The two vessels A and B should be so shaped as to leave between them a space 22 of a nearly uniform width throughout. From this space 22 the air is to be pumped out in any known manner, for example through a valve (not shown) similar to the air-valves employed in pneumatic tires, but so constructed as to permit removal of air from the space 22.

Where so preferred, the wide neck 14 may be stiffened by means of a funnel-like piece 16 of sheet metal soldered at the lower edge on the upper half 11 and at the upper edge on the neck 14. In a similar manner the connection between the narrow neck 4 and the upper half 2 of the inner vessel A may be stiffened by means of a funnel-like piece 17 soldered on or by means of solder so applied to the corner between the half 2 and the neck 14 as to form a solid annular conical body more or less similar to the piece 17. However, this stiffening is not absolutely necessary.

A receptacle 18 for a gas absorbing substance 19 is preferably attached to the bottom of the inner vessel A. This receptacle 18 may be a concave sieve with very fine holes, which sieve is fastened on the outside of the lower half 1 by soldering or otherwise. The gas absorbing substance 19 consists of carbonate of magnesium, which is far superior to charcoal or ferric hydrate usually employed in glass double vessels. Not only is the specific gravity of the carbonate of magnesium considerably smaller than that of carbon, but also its absorbing capacity is about three times as large as that of carbon. The carbonate of magnesium at a low temperature is capable of absorbing a large volume of gas, so that in case air or gas should leak through either of the walls of the vessel, such air or gas will be absorbed by this substance, thereby effectually preventing deterioration of the vacuum insulation.

The thickness of the metal of the narrow neck 4 should be so calculated that the tensile strength of the neck 4 suspended from the solder 15 suffices for carrying the weight of the neck 4, the inner vessel A and the liquefied gas 20 contained therein. This gas may be air, oxygen, hydrogen, or the like. The neck 4 is made so narrow (for example as shown) as to reduce to a minimum the transmission of heat from without to the inner vessel A and its contents 20.

In case the metallic double vessel is intended for transport, two opposite trunnions 21, 21 in a common axis are fastened on the upper half 11 of the outer vessel B, so that it is possible to suspend the whole double vessel filled with liquefied gas by means of these two trunnions in some known frame movable in all directions similar to a universal joint. In this manner the inner vessel A is prevented from considerable displacement relatively to the outer vessel B.

The narrow neck 4 is so pliable as to permit the inner vessel A to readily come in contact with the inside of the outer vessel B on the latter being inclined or turned through a small angle. It is evident, that when the double vessel is turned through a considerable angle, for example through an angle of 90°, as is shown at Fig. 2, the outer vessel B will support the inner vessel A and consequently the narrow neck 4 will be freed from its load. In any case, when the outside of the inner vessel A comes in contact with the inside of the outer vessel B, the insulation of the inner vessel by means of the vacuum will be thereby pierced, so that heat from without will enter the contents 20 and evaporate a little of the liquefied gas. The pressure of the vapor so developed and contained in the space above the level of the liquid will force the liquid at a great speed outward through the narrow neck 4, so that in this manner a satisfactorily quick discharge of the contents is obtained. On returning the double vessel into its normal position shown at Fig. 1, the inner vessel A will by reason of its own weight and of the weight of the liquid contained in it, if any is still left, return to its normal position, in other words it will center itself, so that its insulation by means of the vacuum will be re-established.

The carbonate of magnesium 19 in the receptacle 18 has proved most effective in absorbing evaporated gas, that may escape through pores in the metallic walls of the inner vessel A into the evacuated space 22. A trial metallic double vessel of the construction described above shows, that only five or six per cent. of the liquefied air contained in the inner vessel evaporates within 24 hours, whereas with glass double vessels, which hitherto proved to be the best, from ten to twelve per cent. of the contents were found to escape within the same time.

It is a great advantage of the improved metallic vessel, that the insulation of its inner vessel is in no way reduced through studs, which hitherto were employed for connecting the inner vessel with the outer vessel and thus maintaining the practically uniform width of the evacuated space. It is also a great advantage of the improved metallic vessel, that the pliable narrow neck of the inner vessel permits the latter to place itself on the inside of the outer vessel on the whole vessel being inclined or turned over, as thereby not only the neck is freed from its load, but also a rapid discharge of the contents as described above is obtained. It would be impossible to quickly pour out the liquid from an inner vessel centered within the outer vessel by means of studs, since the most energetic insulation of the liquefied gas by means of the vacuum would prevent the liquid from evaporating, which is absolutely necessary for the rapid discharge.

The metallic double vessel may have any other shape. For example it may be nearly cylindrical, as is illustrated in Fig. 3, which requires no further explanation, except that the dotted lines indicate the relative position of the inner vessel with regard to the outer vessel on the whole being inclined or turned over. The metallic double vessel may also be pear-shaped, as is shown at Fig. 4. The metallic double vessel can be varied in many respects without departing from the spirit of my invention.

I claim:

1. In a metallic vessel for liquefied gases, the combination with a metallic outer vessel having a long wide neck contracted at the upper end, of a metallic inner vessel having a long narrow neck tightly connected at its upper end with the contracted upper end of the wide neck, whereby the inner vessel is suspended, a space of a nearly uniform width throughout being normally left between the outer and inner vessels and between their necks, and gas-absorbing means in said space, the metallic walls of the narrow neck being so thin as to render this neck pliable and to permit the inner vessel to place itself against the inside of the outer vessel on the whole being inclined.

2. In a metallic vessel for liquefied gases, the combination with a metallic inner vessel having a long pliable narrow neck, of a metallic outer vessel having a long wide neck inclosing said inner vessel and the greatest part of its narrow neck, the upper end of the wide neck being contracted and tightly connected with the narrow neck, so that the inner vessel is suspended by means of its narrow neck from the wide neck, a finely perforated receptacle attached to the bottom of said inner vessel, and carbonate of magnesium in said receptacle for absorbing gas, a space of a nearly uniform width being normally left between said inner and outer vessels and between their necks, also between said receptacle and the bottom of said outer vessel.

3. In a metallic vessel for liquefied gases, the combination with a metallic outer vessel having a long wide neck contracted at the upper end, of a metallic inner vessel having a long narrow neck tightly connected at its upper end with the contracted upper end of the wide neck, whereby the inner vessel is suspended, a finely perforated receptacle attached to the bottom of said inner vessel, and carbonate of magnesium in said receptacle for absorbing gas, a space of a nearly uniform width being normally left between said inner and outer vessels and between their necks, also between said receptacle and the bottom of said outer vessel, the metallic walls of the narrow neck being so thin as to render this neck pliable and to permit the inner vessel to place itself on the inside of the outer vessel on the whole being inclined.

CHRISTIAN WILHELM PAULUS HEYLANDT.

Witnesses:
  WALTER LACHMANN,
  ERNEST H. L. MUMMENHOFF.